United States Patent Office 3,158,608
Patented Nov. 24, 1964

3,158,608
BASIC HYDRAZONE DYESTUFFS
Roderich Raue, Leverkusen, Germany, assignor to Farbenfabriken Bayer Aktiengesellschaft, Leverkusen, Germany, a corporation of Germany
No Drawing. Filed Aug. 5, 1960, Ser. No. 47,605
Claims priority, application Germany Aug. 8, 1959
9 Claims. (Cl. 260—240)

The invention relates to new dyestuffs; more particularly it relates to basic dyestuffs having the general formula:

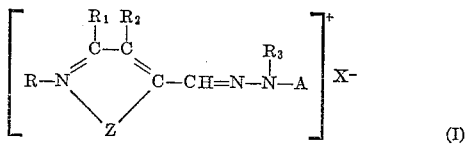
(I)

In this formula R stands for hydrogen or lower alkyl, $R_1$ and $R_2$ stand for hydrogen or substituents being part of a condensed ring, Z denotes a bivalent group which completes the heterocyclic ring to a 6-membered ring, $R_3$ stands for lower alkyl, aryl, cyclohexyl or aralkyl, A means a carbocyclic or heterocyclic residue and X is the residue of an acid used for salt formation of basic methine dyestuffs.

The dyestuffs—with the exception of those wherein R denotes hydrogen and $R_3$ aryl—can be obtained by reacting dyestuffs of the general formula

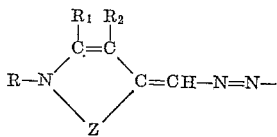
(II)

wherein R, $R_1$, $R_2$, Z and A have the above-stated significance with suitable quaternising agents in the presence or absence of a solvent or diluent.

The dyestuffs of the Formula II serving as starting materials are obtainable, for example, in such a manner that diazotised carbocyclic or heterocyclic amines are coupled with heterocyclic methylene compounds of the general formula

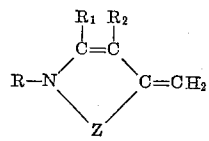

wherein R, $R_1$, $R_2$ and Z have the above-stated significance, and the resulting dyestuff salts are treated with alkaline agents, whereupon the azo-bases are formed. Amino compounds suitable for the diazotisation are, for example, aminobenzene, alkoxy aminobenzenes, halogenaminobenzenes, amino alkylbenzenes, benzidine, aminonaphthalenes, aminoazobenzenes, aminodiphenyl ethers, and aminobenzthiazoles. As heterocyclic methylene compounds there may be mentioned, for instance, 1-methyl-9-methyleneacridine, 1-methyl-6-chloro - 9 - methyleneacridine, 1-methyl-6-methyl-9-methyleneacridine and 1-methyl-4-methylene quinoline.

The dyestuffs of the Formula II serving as starting materials may also be obtained in such manner that compounds of the formula

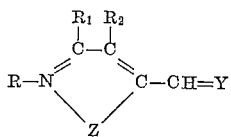

wherein Y denotes oxygen or the residue from an aromatic amide, and Z, R, $R_1$ and $R_2$ have the above significance, for example quinoline-4-aldehyde or acridine-9-aldehyde, are reacted with hydrazine compounds of the general formula

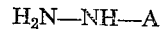
$H_2N$—NH—A wherein A has the above-stated significance, for example with phenylhydrazine or 4-chlorophenylhydrazine, the resulting hydrazones, in the form of the free bases, are treated with quaternising agents, and the resulting dyestuff salts are converted into the dyestuff bases with alkaline agents.

For the conversion of the dyestuffs of the Formula II with quaternising agents into the dyestuffs of Formula I, according to the invention, there may be considered the usual agents, such as dimethyl sulfate, diethyl sulfate, toluenesulfonic acid esters, benzyl bromide or methyl iodide; other common alkylating agents may also be employed. The alkylation reaction is preferably performed in suitable solvents such as acetone, ligroin, benzine, benzene, toluene, chlorobenzene or chloroform.

A special class of dyestuffs of the Formula I contains one or more groups convertible into $NH_2$ groups, e. g. acylamino groups, in the carbocyclic or heterocyclic residue A (which may otherwise be further substituted); these groups are not alkylated in the alklation process of the azo group in the chain according to the process.

Such groups convertible into $NH_2$-groups may be converted into the $NH_2$-groups after alkylation of the azo group according to the usual methods, e.g. in the case of acylamino groups, by splitting off the acyl residue in an aqueous or alcoholic medium at an elevated temperature in the presence of acids, such as sulfuric acid, hydrochloric acid, phosphoric acid, 4-toluene-sulfonic acid, or alkylsulfuric acids.

A modified process for the production of the novel dyestuffs of the Formula I consists in reacting compounds having the general formulae

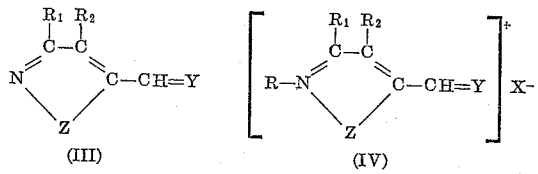
(III)            (IV)

wherein X, Y, Z, R, $R_1$ and $R_2$ have the above-stated significance, with hydrazine compounds of the general formula (V)
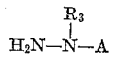
$H_2N$—N—A wherein A and $R_3$ have the above-stated significance, converting the resulting hydrazones into the salt form, if desired, or reacting them in the form of the free bases with quaternising agents, and in the case where the residue A contains groups convertible into $NH_2$-groups, converting these into $NH_2$-groups when this is desired.

In accordance with this process, it is also possible to obtain, inter alia, those dyestuffs wherein (a) R denotes hydrogen and (b) $R_3$ denotes aryl, when (a) starting with compounds of the Formula III and carrying out a usual salt formation in the reaction products by the action of hydrogen acids, or (b) employing diarylhydrazones of the Formula IV.

Compounds of the Formulae III and IV suitable for carrying out this modified process are, e.g., pyridine-4-aldehyde, quinoline-4-aldehyde, 6-chloroquinoline-4-aldehyde, acridine-9-aldehyde, 6-chloracridine-9-aldehyde, as well as the azomethines from 1,4-dimethyl quinolinium methosulfate, 6-chloro-1,4-dimethyl quinolinium methosulfate, 6-methoxy-1,4-dimethyl quinolinium methosulfate, or 1,9-dimethyl acridinium methosulfate, and 4-nitroso dimethyl aniline.

Suitable hydrazine compounds of the Formula V are, for example: N-phenyl-N-methyl hydrazine, N-phenyl-N-ethyl hydrazine, N-phenyl-N-benzyl hydrazine, N,N-diphenyl hydrazine, N-4-methylphenyl-N-methyl hydrazine, N-4-methoxyphenyl-N-methyl hydrazine, and N-4-chlorophenyl-N-methyl hydrazine.

If aldehyde compounds are employed for the formation of hydrazines, the reaction can be carried out in the absence or in the presence of a solvent, such as alcohol or dilute hydrochloric acid or acetic acid; if azomethines are employed, the presence of acids, such as hydrochloric acid, sulfuric acid, or phosphoric acid is essential. The reaction of the free hydrazone bases with quaternising agents, such as, e.g., dimethyl sulfate, diethyl sulfate, 4-toluenesulfonic acid esters, benzyl bromide, or methyl iodide, is preferably carried out in an inert solvent such as acetone, ligroin, benzine, benzene, toluene, chlorobenzene or chloroform. Other alkylating agents can likewise be used.

The novel basic dyestuffs are suitable for the dyeing a wide variety of types of materials, such as textiles, paper, or leather. It has moreover, been found that the dyestuffs free from sulfonic acid or carboxylic acid groups yield on materials from polyacrylonitrile dyeings which are distinguished by good fastness properties, e.g. by good fastness to light, to wet processing, to sublimation and to ironing. The dyestuffs also exhibit good solubility.

The parts indicated in the following examples are parts by weight.

The examples are to illustrate the invention without, however, limiting it thereto.

*Example 1*

28.9 parts of the dyestuff base obtained by coupling diazotised 4-anisidine with 1-methyl-9-methyleneacridine and treating the dyestuff salt with dilute sodium hydroxide solution are dissolved, with warming, in 100 parts of chlorobenzene, and treated dropwise with 11.7 parts of dimethyl sulfate. The reaction mixture is then heated to 100° C. and stirred on a boiling water bath for 3 hours. Thereafter, the mixture is treated with 1000 parts of water, and the chlorobenzene is distilled off by steam. It is now clarified with active charcoal, steam is again briefly introduced, the product filtered, and salted out with 104 parts of common salt. The dyestuff, filtered off by suction, is washed with a solution of common salt, then dissolved again in boiling water, and salted out with common salt.

The dyestuff dyes materials from polyacrylonitrile a reddish blue with very good fastness properties.

Dyestuffs having similarly good properties are obtained when dyestuff bases are used which are prepared with aniline, 4-toluidine, or 4-aminoacetanilide as diazo component.

*Example 2*

78.5 parts of quinoline-4-aldehyde are dissolved, with warming, in 200 parts of methanol, and treated dropwise at 35° C. with 54 parts of phenylhydrazine, whereupon the temperature rises to 57° C. After completion of the exothermic reaction, the mixture is heated to boiling, allowed to boil under reflux for 2 hours, and then cooled. Quinoline-4-aldehyde-phenylhydrazone thereby separates out as pale yellow crystals, which melt at 168–172° C. after recrystallization from a mixture of alcohol and acetonitrile.

A suspension of 25.7 parts of this hydrazone in 150 parts of toluene is boiled under reflux for 10 minutes, then cooled to 80° C. and treated dropwise with 13.2 parts of dimethyl sulphate. The mixture is then again heated to 100° C. and stirred on a boiling water bath for 3 hours. After cooling, the separated reaction product is filtered off by suction, and for further purification dissolved in 1000 parts of water, the solution is clarified with animal charcoal, and after cooling salted out with common salt.

25.3 parts of the chloride of 1-methylquinoline-4-aldehyde-phenylhydrazone thus obtained are ground with 35 parts of a 10% sodium carbonate solution and added to 500 parts of water. The mixture is stirred at room temperature for about 12 hours, then warmed to 40° C. and stirred at 40° C. for another 2 hours; the resulting precipitate is then filtered off by suction, washed with 1000 parts of water at 40° C., and recrystallised from methanol.

8.6 parts of the dyestuff base thus obtained with M.P. 114–116° C. (decomp.) are dissolved, with warming, in 100 parts of toluene, treated dropwise with 4.2 parts of dimethyl sulphate, and then heated to 100° C. The separated alkylated dyestuff salt is induced to crystallisation by rubbing. It is heated on a boiling water bath for another 3 hours, the reaction product cooled, and filtered off by suction. The dyestuff is then dissolved in 600 parts of water, clarified with animal charcoal, and salted out with common salt.

The dyestuff dyes polyacrylonitrile fibres a slightly reddish orange which is distinguished by excellent fastness to light.

*Example 3*

42.7 parts of pyridine-4-aldehyde are dissolved in 100 parts of methanol, slight warming occurring. The solution is again cooled to room temperature, and 48.7 parts of monomethyl phenylhydrazine are then added dropwise. The temperature thereby rises to 55° C. After completion of the exothermic reaction, the mixture is heated to boiling and boiled under reflux for 2 hours. The solvent is distilled off in vacuo and the residue recrystallised from cyclohexane. 21.1 parts of pyridine-4-aldehyde-phenylmethyl hydrazone with M.P. 79–82° C. thus obtained are then dissolved in 1000 parts of boiling water with the addition of 18 parts of concentrated hydrochloric acid ($d$ 1.19), the solution is clarified with animal charcoal, and after cooling, the dyestuff is salted out with common salt.

The dyestuff dyes materials from polyacrylonitrile in reddish yellow shades having good fastness properties.

When using in the preceding example, N,N-diphenyl-hydrazine instead of N-phenyl-N-methyl-hydrazine, but otherwise proceeding in the same manner, pyridine-4-aldehyde-diphenyl hydrazone (M.P. 133–136° C.) is obtained which can be converted into the dyestuff salt by the method described above. With the same result, N-phenyl-N-benzyl-hydrazine, N-phenyl-N-butyl-hydrazine, or N-phenyl-N-chlorethyl hydrazine can also be employed instead of N-phenyl-N-methyl hydrazine; dyestuffs are obtained which dye materials from polyacrylonitrile in very fast, reddish-yellow shades.

*Example 4*

21.1 parts of pyridine-4-aldehyde-phenylmethyl hydrazone prepared according to the instructions of Example 3 are dissolved in 150 parts of toluene and treated dropwise with 13.2 parts of dimethyl sulphate. Thereby, the quaternisation product separates out as crystals. The reaction mixture is heated to 100° C., stirred on a boiling water bath for 3 hours, and the dyestuff is isolated after previously cooling the crystal slurry. For further purification, the dyestuff is dissolved in boiling water, clarified with animal charcoal, and after cooling salted out with common salt. The dyestuff dyes polyacrylonitrile fibres in yellow shades having excellent fastness to light.

If pyridine-4-aldehyde-diphenyl-hydrazone (M.P. 133–136° C.) is used instead of pyridine-4-aldehyde-phenylmethyl hydrazone, but otherwise proceeding in the same manner, a dyestuff is obtained which dyes materials from polyacrylonitrile a very fast reddish yellow.

Example 5

78.5 parts of quinoline-4-aldehyde are dissolved, with warming, in 60 parts of alcohol, and treated dropwise with 63.0 parts of N-methyl-N-phenyl hydrazine. The reaction mixture is then heated to boiling with stirring under reflux for 3 hours, and cooled. The bright yellow crystals of quinoline-4-aldehyde-phenylmethyl hydrazone thereby separating out are recrystallised from a mixture of methanol and ethanol; they then melt at 131–133° C. 26.1 parts of quinoline-4-aldehyde-phenylmethyl hydrazone are now dissolved, with warming, in 1000 parts of glacial acetic acid, and the solution is poured into 3000 parts of boiling water which contain 18 parts of concentrated hydrochloric acid (d 1.19). The product is clarified with animal charcoal, and after cooling, salted out with common salt.

The dyestuff dyes materials from polyacrylonitrile a slightly reddish orange having very good fastness properties.

When using in the preceding example N,N-diphenyl-hydrazine instead of N-phenyl-N-methyl hydrazine, but otherwise proceeding in the same manner, quinoline-4-aldehyde-diphenyl hydrazone (M.P. 143–146° C.) is obtained which can be converted into the dye salt by the method described above. With the same result, N-phenyl-N-benzyl hydrazine, N-phenyl-N-ethyl hydrazine or N-phenyl-N-cyclohexyl hydrazine can also be employed instead of N-phenyl-N-methyl hydrazine. Dyestuff salts are obtained which dye materials from polyacrylonitrile to a slightly reddish orange, possessing excellent fastness properties.

Example 6

26.1 parts of quinoline-4-aldehyde-phenylmethyl hydrazone prepared according to the instructions of Example 5 are dissolved, with warming, in 150 parts of toluene, and treated dropwise with 13.2 parts of dimethyl sulphate. The reaction mixture is slowly heated to boiling, and the quaternisation product induced to crystallisation by rubbing. The mixture is then kept on a boiling water bath for 3 hours, and after cooling, the precipitate filtered off by suction. The separated dyestuff is dissolved in 1000 parts of boiling water, clarified with animal charcoal, and after cooling, salted out with common salt.

The dyestuff dyes materials from polyacrylonitrile a slightly reddish orange having excellent fastness to light.

If quinoline-4-aldehyde-diphenyl-hydrazine (M.P. 143–146° C.) is employed instead of quinoline-4-aldehyde-phenylmethyl-hydrazone, but otherwise proceeding in the same method, a dyestuff is obtained which dyes materials from polyacrylonitrile a slightly reddish orange with very good fastness to light.

Example 7

8.3 parts of acridine-9-aldehyde and 4.9 parts of N-phenyl-N-methyl hydrazine are added to a mixture of 50 parts of 10% hydrochloric acid and 100 parts of water. The mixture is then heated to 100° C., and stirred on a boiling water bath for 2 hours. The reaction product is introduced into a mixture of 1000 parts of boiling water and 20 parts of glacial acetic acid, the solution is treated with animal charcoal, filtered, cooled down, and salted out with common salt. The dyestuff thus obtained is again dissolved in 1000 parts of boiling water previously treated with 5 parts of concentrated hydrochloric acid, and after cooling salted out with common salt.

The dyestuff dyes yarns and fabrics from polyacrylonitrile from an acid liquor a reddish violet having very good fastness properties.

Example 8

6 parts of the salt of acridine-9-aldehyde-phenylmethyl hydrazone obtained according to Example 7 are dissolved, with warming, in 100 parts of alcohol, and the solution is then poured, with stirring, into a mixture of 500 parts of water and 20 parts of a 10% sodium hydroxide solution. The mixture is stirred for another 3 hours, the precipitated free yellowish brown hydrazone base is then filtered off by suction and washed with water until the filtrate running off is neutral. After recrystallisation from dioxane, the base melts at 213°–216° C.

3.6 parts of the acridine-9-aldehyde-phenylmethyl hydrazone base thus obtained are dissolved, with warming, in 50 parts of toluene, treated dropwise with 1.6 parts of dimethyl sulphate and then warmed to 100° C., the quaternisation product soon separating out as crystals. The mixture is heated on a boiling water bath for another 3 hours, then cooled, the separated reaction product is filtered off by suction and dissolved in 250 parts of boiling water. It is thereupon clarified with animal charcoal, allowed to cool, and salted out with common salt.

The dyestuff thus obtained dyes polyacrylonitrile fibres a bluish violet having very good fastness properties.

Example 9

10.6 parts of pyridine-4-aldehyde-phenylmethyl hydrazone are dissolved, with warming, in 50 parts of toluene, and thereafter the reaction mixture is treated dropwise with 6.6 parts of allyl bromide. The solution which is subsequently heated to boiling starts to separate out the crystalline dyestuff at 64° C. It is allowed to boil under reflux for 6 hours, then cooled, and the alkylated dyestuff is filtered off by suction. It dyes materials from polyacrylonitrile a yellowish orange very fast to light.

Example 10

10.6 parts of pyridine-4-aldehyde-phenylmethyl hydrazone are heated to 140° C. together with 40 parts of benzyl chloride, and stirred at this temperature for 5 hours. The reaction mixture is then transferred to a steam distillation flask and treated with 500 parts of water. The excess benzyl chloride is distilled off by steam, and the residual solution of the dyestuff, after clarifying with animal charcoal filtered whilst hot, and salted out with 6% of common salt. The isolated dyestuff can be further purified by dissolving in water, repetition of clarifying with active charcoal, and salting out with 5% of common salt. It dyes yarns and fabric from polyacrylonitrile a reddish yellow having very good fastness properties.

If ω-chlor-acetophenone is employed instead of benzyl chloride, but otherwise proceeding in the same manner, a dyestuff is obtained which also dyes materials from polyacrylonitrile a very fast reddish yellow.

Example 11

13.1 parts of quinoline-4-aldehyde-phenylmethyl hydrazone are dissolved, with warming to 72° C., in 100 parts of toluene. 8.1 parts of diethyl sulphate are added to this solution, and it is then heated to 100° C. After stirring on a boiling water bath for three hours, the reaction mixture is cooled, and the separated dyestuff is filtered off by suction. It can be still further purified by clarifying with active charcoal, and precipitating with 6% of common salt. It dyes materials from polyacrylonitrile to a reddish orange with very good fastness to light and wetting.

Example 12

13.1 parts of quinoline-4-aldehyde-phenylmethyl hydrazone and 15 parts of isopropyl iodide are sealed into a bomb tube and heated to 130° C. for 3 hours in a Carius furnace. After cooling, the reaction product is transferred to a steam distillation flask, and 2000 parts of water are added. The excess isopropyl iodide is distilled off by steam. The dyestuff is separated out from the filtrate with 4% of common salt. It dyes fibres from polyacrylonitrile a slightly reddish orange with very good fastness to light.

If butyl bromide is used instead of isopropyl iodide, but otherwise proceeding in the same manner, a dyestuff is obtained which also dyes fibres from polyacrylonitrile an orange fast to light.

*Example 13*

A mixture of 13.4 parts of quinoline-4-aldehyde-phenylmethyl hydrazone and 40 parts of 4-chlorobenzyl chloride is heated, with stirring, to 140° C. for 5 hours. 2000 parts of water are then added thereto, and the excess 4-chlorobenzyl chloride is distilled off by steam. The residual solution of the dyestuff is filtered whilst hot and the dyestuff salted out from the filtrate with 1% of common salt. For purification, the product is dissolved in 4000 parts of water, clarified with active charcoal, and precipitated with 1% of common salt. The dyestuff dyes materials from polyacrylonitrile a fast orange.

*Example 14*

9.8 parts of acridine-9-aldehyde are dissolved, with warming, in 50 parts of alcohol and 8.7 parts of N,N-diphenyl hydrazine are added to it. The solution is then heated to boiling under reflux for 4 hours, whereby crystals separate. After cooling the reaction mixture, the crystals are filtered off by suction and recrystallised from 90 parts of dioxane. The acridine-9-aldehyde-diphenyl hydrazone thus obtained melts at 214–218° C.

10.3 parts of acridine-9-aldehyde-diphenyl hydrazone are stirred on a boiling water bath for 10 minutes with 50 parts of toluene. 3.5 parts of dimethyl sulphate are then added dropwise to the reaction mixture and heating on a boiling water bath is continued for another 3 hours. After the supernatent toluene has been poured off, the dyestuff is dissolved in 1500 parts of water and 50 parts of glacial acetic acid. Active charcoal is added to the solution, the latter filtered and the dyestuff is salted out with 6% of common salt. For further purification, the dyestuff is dissolved in 1500 parts of water, clarified with active charcoal and salted out with 2% of common salt. This dyestuff dyes polyacrylonitrile fibres a violet which is very fast to light.

I claim:

1. A dyestuff of claim 9 wherein R is lower alkyl, B is a pyridine nucleus, $R_3$ is lower alkyl and A is a radical of the benzene series.

2. A dyestuff of claim 9 wherein R is lower alkyl, B is a quinoline nucleus, $R_3$ is lower alkyl and A is a radical of the benzene series.

3. A dyestuff of claim 9 wherein R is lower alkyl, B is an acridine nucleus, $R_3$ is lower alkyl and A is a radical of the benzene series.

4. The dyestuff of the formula

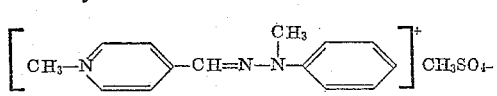

5. The dyestuff of the formula

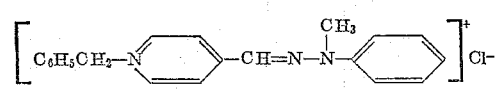

6. The dyestuff of the formula

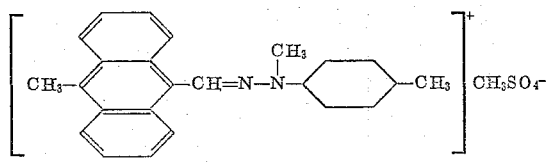

7. The dyestuff of the formula

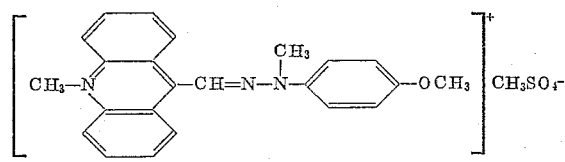

8. A dyestuff of the formula

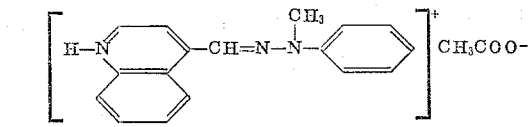

9. A dyestuff of the formula

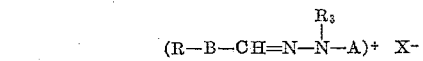

wherein R is a member selected from the group consisting of hydrogen, saturated lower alkyl, unsaturated lower alkyl, benzyl and chlorobenzyl, B is a nucleus selected from the class consisting of

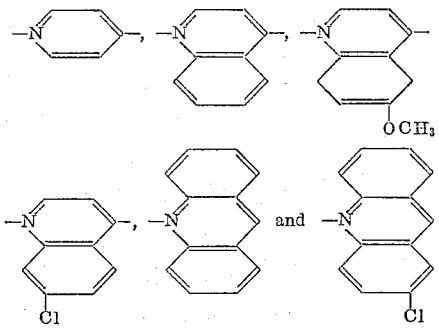

in which nuclei R is attached to the nitrogen atom and the residue

is attached to the carbon atom standing in the p-position to N, $R_3$ is a member selected from the group consisting of lower alkyl, phenyl and benzyl, A is a member selected from the group consisting of benzene, diphenyl, azobenzene, diphenylether, napthalene and benzthiazole series, and X is the residue of an acid used for salt formation of basic dyestuffs.

References Cited in the file of this patent

UNITED STATES PATENTS

| | | |
|---|---|---|
| 2,620,341 | Baltzly et al. | Dec. 2, 1952 |
| 2,628,152 | Meunier et al. | Feb. 10, 1953 |
| 2,774,757 | Kuhle et al. | Dec. 18, 1956 |
| 2,840,443 | Smith | June 24, 1958 |
| 2,855,398 | Voegtli | Oct. 7, 1958 |
| 2,913,303 | Baumann et al. | Nov. 17, 1959 |

OTHER REFERENCES

Kaufmann et al.: Ber. Deut. Chem., vol. 46, pages 49–57 (1913).

Lenart: Liebig's Annalen, vol. 410, pages 95–116 (1915) (page 104 relied on).

Konig: Ber. Deut. Chem., vol. 56, pages 1543–1550 (1923).

Konig: Ber. Deut. Chem. vol. 57, pages 891–5 (1924).

Kharkharov: Chem. Abstracts, volume 52, page 13521 (1958).